United States Patent
Ishikawa et al.

(10) Patent No.: US 12,399,695 B2
(45) Date of Patent: Aug. 26, 2025

(54) VEHICLE CONTROL DEVICE, PROGRAM UPDATE METHOD, AND PROGRAM UPDATE SYSTEM

(71) Applicant: TOYOTA JIDOSHA KABUSHIKI KAISHA, Toyota (JP)

(72) Inventors: Tomoyasu Ishikawa, Nagoya (JP); Takanori Ariga, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/071,086

(22) Filed: Oct. 15, 2020

(65) Prior Publication Data

US 2021/0132937 A1 May 6, 2021

(30) Foreign Application Priority Data

Oct. 31, 2019 (JP) .................. 2019-198783

(51) Int. Cl.
*G06F 8/65* (2018.01)
*H04W 4/44* (2018.01)

(52) U.S. Cl.
CPC .............. *G06F 8/65* (2013.01); *H04W 4/44* (2018.02)

(58) Field of Classification Search
CPC ............. G06F 8/65; H04W 4/44; B60R 16/02
See application file for complete search history.

(56) References Cited

U.S. PATENT DOCUMENTS

| | | | |
|---|---|---|---|
| 10,394,548 B2 * | 8/2019 | Fox .................... | G06F 12/0646 |
| 10,884,902 B2 * | 1/2021 | Kislovskiy ......... | G06F 11/0706 |
| 10,913,451 B2 * | 2/2021 | Li ..................... | B60W 50/0225 |
| 11,204,750 B2 * | 12/2021 | Tatourian ............. | H04W 4/44 |
| 12,045,551 B2 * | 7/2024 | Fox .................... | G06F 11/3692 |
| 2008/0204358 A1 * | 8/2008 | Sato .................... | H04N 21/654 |
| | | | 348/E5.002 |
| 2017/0134164 A1 * | 5/2017 | Haga .................... | B60R 16/023 |
| 2017/0262277 A1 * | 9/2017 | Endo .................... | H04L 67/04 |
| 2018/0074811 A1 * | 3/2018 | Kiyama ................. | H04L 67/12 |
| 2018/0152341 A1 * | 5/2018 | Maeda ................. | H04L 41/082 |
| 2019/0193653 A1 * | 6/2019 | Nakamura ............ | G06F 9/4893 |
| 2019/0212732 A1 * | 7/2019 | Takanashi ............ | G05D 1/0061 |
| 2019/0250902 A1 * | 8/2019 | Tateishi ................. | G06F 8/654 |
| 2019/0286454 A1 * | 9/2019 | Sano ................... | B60R 16/0231 |
| 2019/0324458 A1 * | 10/2019 | Sadeghi .............. | G05D 1/0276 |
| 2019/0332371 A1 * | 10/2019 | Kobayashi ............ | G07C 5/008 |
| 2020/0114927 A1 * | 4/2020 | Yokota ................. | B60W 50/00 |

(Continued)

FOREIGN PATENT DOCUMENTS

| | | | | |
|---|---|---|---|---|
| CN | 107533491 A | | 1/2018 | |
| CN | 108701065 A | * | 10/2018 | ............ B60R 16/02 |

(Continued)

*Primary Examiner* — Daxin Wu
(74) *Attorney, Agent, or Firm* — Oblon, McClelland, Maier & Neustadt, L.L.P.

(57) ABSTRACT

A vehicle control device includes a memory having a first storage area for storing a program related to vehicle control and a second storage area for storing an update program for updating the program, and a controller configured to determine whether a vehicle is in a stop state and start an update process of updating the program stored in the first storage area with the update program stored in the second storage area when the controller determines that the vehicle is in the stop state.

12 Claims, 7 Drawing Sheets

(56) References Cited

U.S. PATENT DOCUMENTS

| | | | | |
|---|---|---|---|---|
| 2020/0387368 A1* | 12/2020 | Jeong | ................ | G06F 8/65 |
| 2021/0011711 A1* | 1/2021 | Ogawa | ................ | G06F 8/62 |
| 2021/0165649 A1* | 6/2021 | Harata | ................ | G06F 3/0679 |
| 2021/0309237 A1* | 10/2021 | Sekiguchi | ................ | G06F 11/1433 |
| 2021/0349709 A1* | 11/2021 | Nakatsukasa | ................ | G06F 8/656 |

FOREIGN PATENT DOCUMENTS

| | | | | |
|---|---|---|---|---|
| CN | 109643254 A | 4/2019 | | |
| JP | 2011-148398 A | 8/2011 | | |
| JP | 2015-101229 A | 6/2015 | | |
| JP | 2017-097620 A | 6/2017 | | |
| JP | 2017-134506 A | 8/2017 | | |
| JP | 2018-037059 A | 3/2018 | | |
| JP | 2018-045515 A | 3/2018 | | |
| JP | 2018-086894 A | 6/2018 | | |
| JP | 2018-100002 A | 6/2018 | | |
| JP | 2019-020866 A | 2/2019 | | |
| WO | WO 2018/230314 A1 | 12/2018 | | |
| WO | WO-2020032120 A1 * | 2/2020 | ............ | B60W 50/00 |

\* cited by examiner

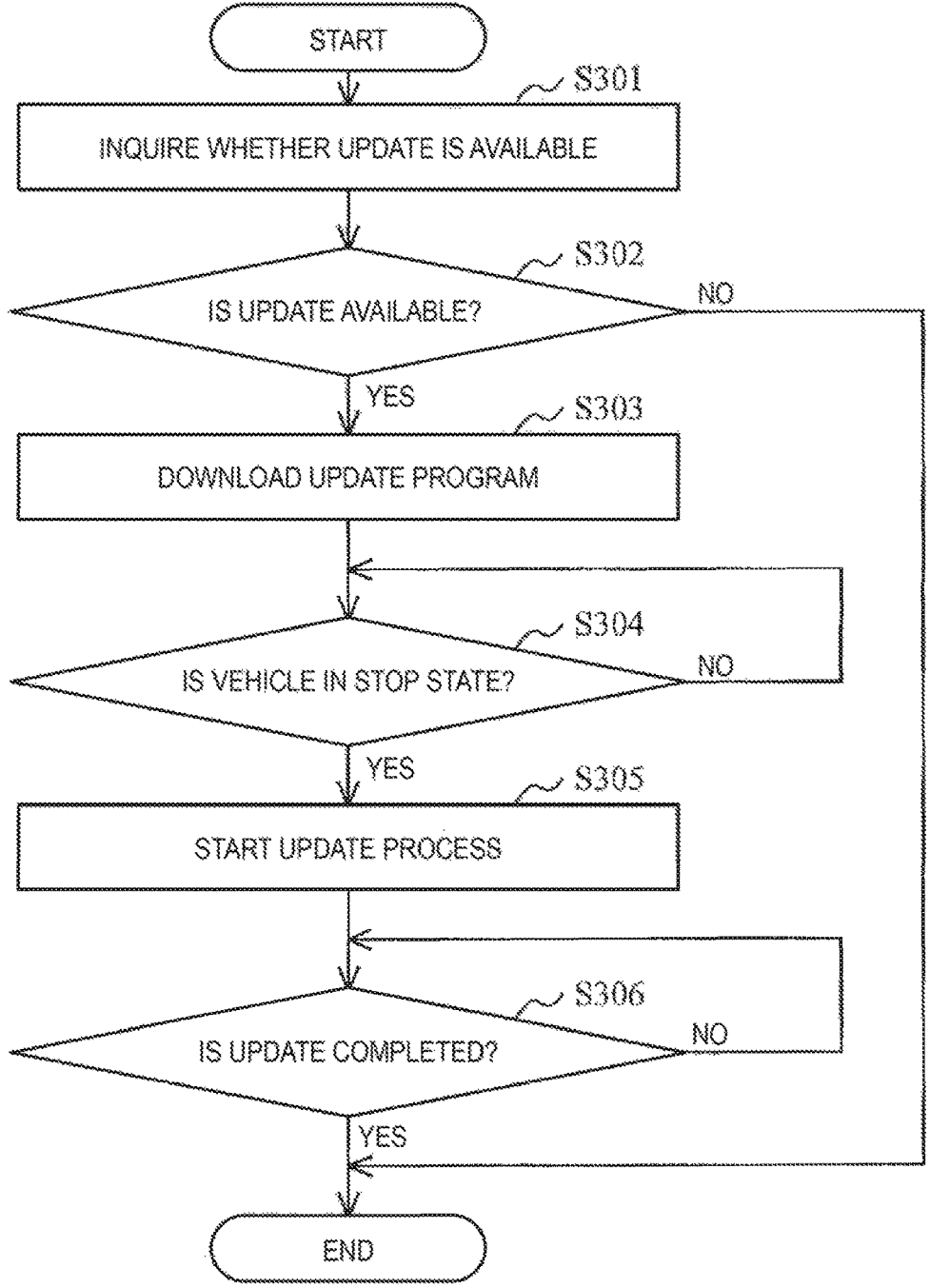
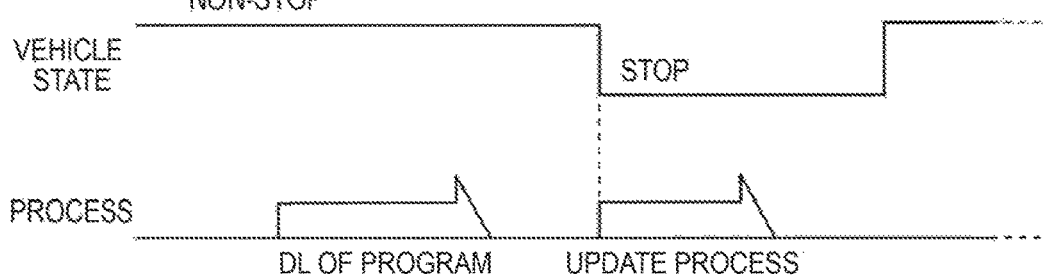

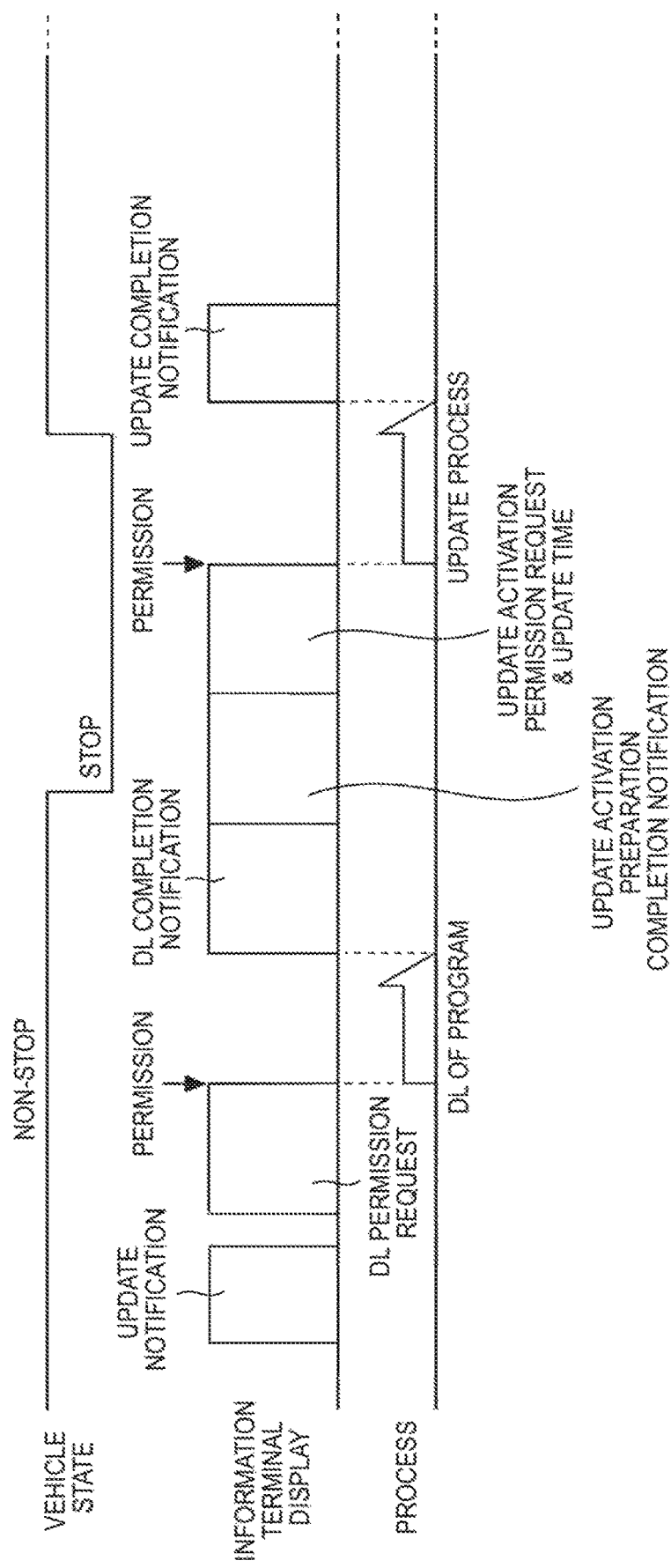

VEHICLE CONTROL DEVICE, PROGRAM UPDATE METHOD, AND PROGRAM UPDATE SYSTEM

INCORPORATION BY REFERENCE

The disclosure of Japanese Patent Application No. 2019-198783 filed on Oct. 31, 2019 including the specification, drawings and abstract is incorporated herein by reference in its entirety.

BACKGROUND

1. Technical Field

The present disclosure relates to a vehicle control device, a program update method, and a program update system.

2. Description of Related Art

A vehicle is equipped with a plurality of control devices called electronic control units (ECUs). Each of the control devices such as the ECUs includes a memory in which one or more programs executed by one or more controllers such as central processing units (CPUs) are stored, and executes respective functions. To improve the functions of the control devices, it has been proposed to rewrite and update the programs stored in the memories to a newer version. In particular, it has been proposed that the vehicle receives data for updating the programs from an external server via wireless communication so that the programs can be updated without the need to visit a maintenance shop or the like.

Japanese Unexamined Patent Application Publication No. 2011-148398 (JP 2011-148398 A) discloses a program update system for updating a program installed in an ECU mounted on a vehicle. In the system, a management device manages version information and an update file for each vehicle ID. Based on the vehicle 1D transmitted from the ECU, the management device transmits the update file to the ECU only when the program installed in the ECU is not the latest version, thereby improving the distribution efficiency.

SUMMARY

When the need to execute a current program arises while updating the current program using the data for updating the program, an update process that is being executed may be required to be interrupted temporarily. When such an interruption in the update process occurs, a time from the start of a program update process to the completion of the program update process becomes long.

The present disclosure provides a vehicle control device, a program update method, and a program update system that can suppress occurrence of an interruption in a program update process.

A first aspect of the present disclosure relates to a vehicle control device. The vehicle control device includes a memory having a first storage area for storing a program related to vehicle control and a second storage area for storing an update program for updating the program, and a controller configured to determine whether a vehicle is in a stop state and start an update process of updating the program stored in the first storage area with the update program stored in the second storage area when the controller determines that the vehicle is in the stop state.

According to the first aspect of the present disclosure, the controller may be configured to derive, after the update program is downloaded from a management server that manages the update program to the second storage area, an update time that is a time estimated to be required from a start of the update process to a completion of the update process. The update time is derived based on the update program that has been downloaded. The controller may be configured to allow an information terminal that is communicable with the vehicle to display at least the update time when the controller determines that the vehicle is in the stop state after deriving the update time.

According to the first aspect of the present disclosure, the controller may be further configured to allow, when the controller determines that the vehicle is in the stop state after deriving the update time, the information terminal to display a permission request for activating the update process. The controller may be configured to start the update process when the controller receives via the information terminal a permission for activating the update process.

According to the first aspect of the present disclosure, the controller may be configured to acquire at least a state of a power supply of the vehicle as vehicle information and determine that the vehicle is in the stop state when the power supply of the vehicle is off.

According to the first aspect of the present disclosure, the controller may be configured to acquire at least a state of a parking brake as vehicle information and determine that the vehicle is in the stop state when the parking brake is activated.

According to the first aspect of the present disclosure, the controller may be configured to acquire at least a vehicle speed as vehicle information and determine that the vehicle is in the stop state when the vehicle speed is zero.

A second aspect of the present disclosure relates to a program update method. The program update method is performed by a vehicle control device including a memory having a first storage area for storing a program related to vehicle control and a second storage area for storing an update program for updating the program, and a controller. The program update method includes determining, by the controller, whether a vehicle is in a stop state and starting, by the controller, an update process of updating the program stored in the first storage area with the update program stored in the second storage area when the controller determines that the vehicle is in the stop state.

A third aspect of the present disclosure relates to a program update system. The program update system includes a vehicle control device mounted on a vehicle and including a memory having a first storage area for storing a program related to vehicle control and a second storage area for storing an update program for updating the program, and a management server that manages the update program and that communicates with the vehicle so as to allow the update program to be downloaded and stored in the second storage area of the vehicle control device. The vehicle control device is configured to acquire information on the vehicle, determine whether the vehicle is in a stop state based on the information that has been acquired, and start an update process of updating the program stored in the first storage area with the update program stored in the second storage area when the vehicle control device determines that the vehicle is in the stop state.

According to the vehicle control device, the program update method, and the program update system of the present disclosure described above, the program update process is started at a timing when the vehicle is in the stop state so that it is assumed that there is enough time until the execution of the current program is requested. Thus, it is possible to suppress the occurrence of an interruption in the program update process.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3 is a flowchart of a program update process executed by the control device according to a first example;

FIG. 4A is an example of a transition in a vehicle state and a start timing of the update process in the first example;

FIG. 6B is an example of the transition in the vehicle state and the start timing of the update process in the second example.

DETAILED DESCRIPTION OF EMBODIMENTS

A control device of the present disclosure stores an update program in a storage area that is different from a storage area in which a current program executed during vehicle control is stored, and starts a process of updating the current program with the update program at a timing while a vehicle is in stop state. Thus, it can be expected that there is enough time until the execution of the current program is subsequently requested and it is possible to suppress the occurrence of an interruption in the program update process.

Embodiment

Figure 1:
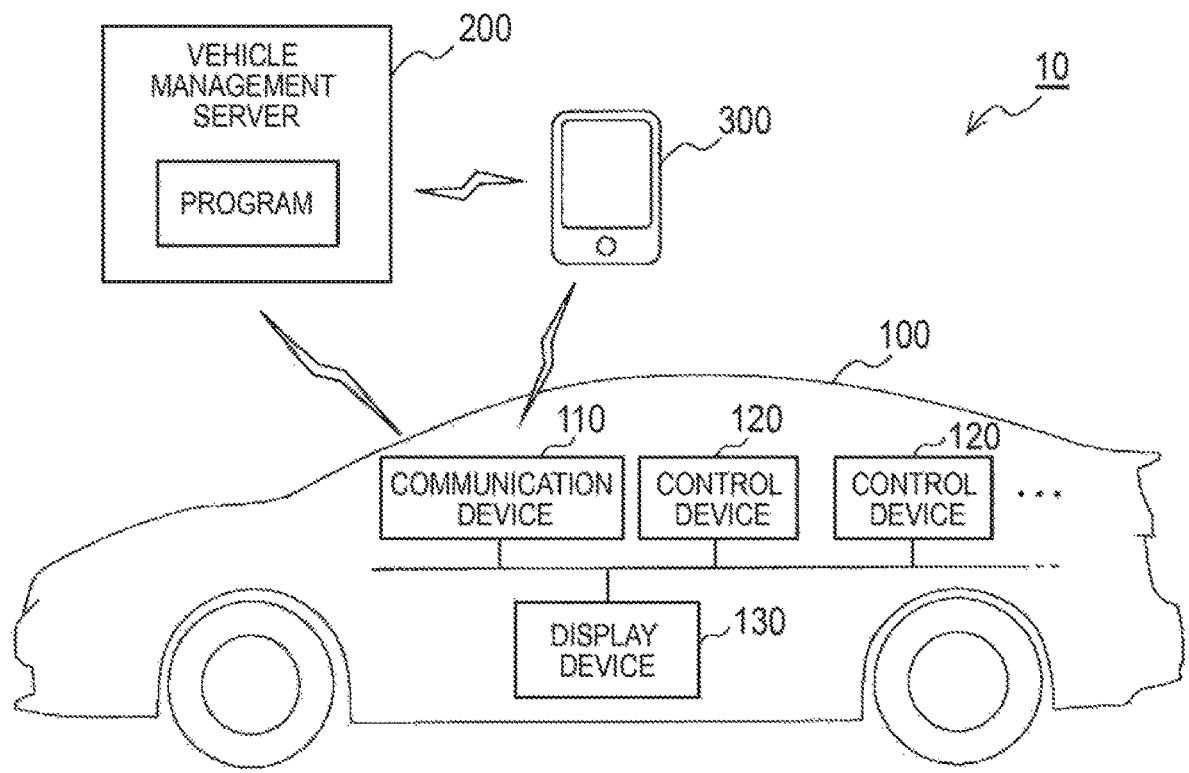
FIG. 1 is a diagram illustrating a configuration example of a program update system to which a control device according to an embodiment of the present disclosure is applied.

Hereinafter, an embodiment of the present disclosure will be described in detail with reference to the drawings.
Configurations FIG. 1 is a diagram illustrating a configuration example of a program update system to which a control device according to the embodiment of the present disclosure is applied. A program update system 10 illustrated in FIG. 1 includes a vehicle 100, a vehicle management server 200, and a mobile device 300. The vehicle 100 includes a communication device 110, a plurality of control devices 120, and a display device 130. The communication device 110, the control devices 120, and the display device 130 are communicably connected to each other via an in-vehicle network such as a controller area network (CAN). The number of the control devices 120 is not limited.

The communication device 110 is a data communication module (DCM) or the like and is communicably connected to an external device such as the vehicle management server 200 and the mobile device 300 via a wireless network such as the 4th generation mobile system (4G) or Wi-Fi.

Figure 2:
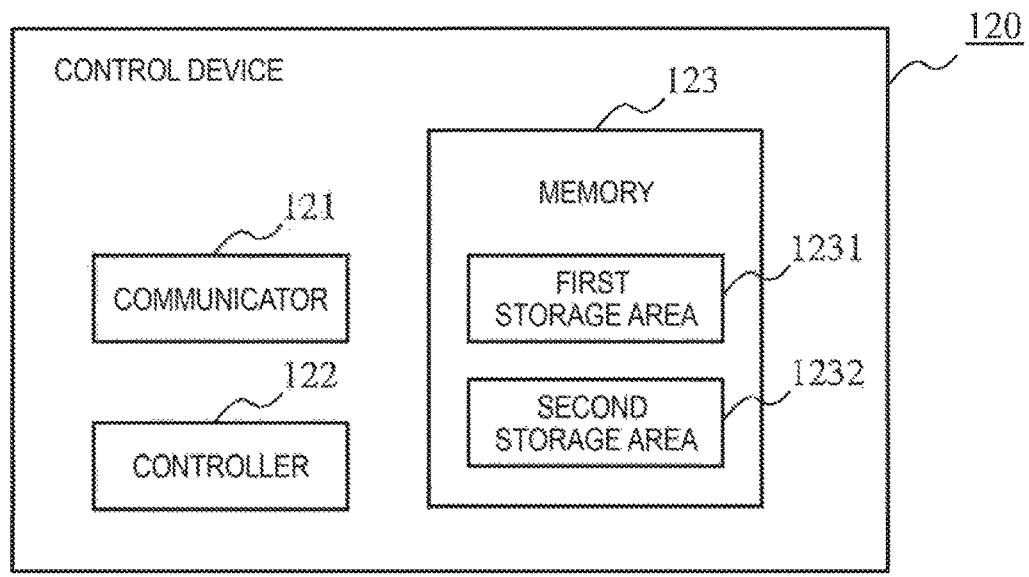
FIG. 2 is a diagram illustrating a configuration example of the control device.

The control devices 120 are devices that perform various controls of the vehicle 100, which are called ECUs, for example. As illustrated in FIG. 2, each of the control devices 120 includes a communicator 121, a controller 122, and a memory 123.

The communicator 121 communicates with the vehicle management server 200 via the communication device 110 of the vehicle 100, and inquires the vehicle management server 200 on updates and downloads an update program from the vehicle management server 200. The controller 122 controls processes of the control device 120 including each process (described later) of determination of a vehicle state, program update, update time derivation, and display of update status. The memory 123 stores one or more programs to be executed by the controller 122. The memory 123 individually has a first storage area 1231 for storing a program (current program) related to vehicle control and a second storage area 1232 for storing an update program which is data necessary for updating the current program.

The first storage area 1231 and the second storage area 1232 of the memory 123 are not limited to the configuration shown in FIG. 2, and may be provided as two physically separate memories. Not all the control devices 120 of the vehicle 100 need to be program-updateable devices provided with the first storage area 1231 and the second storage area 1232.

The vehicle management server 200 is a server that manages the update program that is the data used to update the current program of the control devices 120 mounted on the vehicle 100. The vehicle management server 200 stores the update program for the current program of the control devices 120 in a memory (not shown) and performs wireless communication with the communication device 110 of the vehicle 100 to receive inquiries on the updates from the vehicle 100 and allows the vehicle 100 to download the update programs from the vehicle management server 200.

The display device 130 is an information terminal having a display screen for displaying information (update status information) on the status of the program update process in the control device 120. The display device 130 displays a predetermined notification or a permission request on its screen based on an instruction to display the update status information transmitted from the control device 120 via the in-vehicle network, or based on an instruction to display the update status information transmitted from the vehicle management server 200 via the wireless network. Examples of the display device 130 include a multi-information display and a vehicle navigation device mounted on the vehicle 100.

The mobile device 300 is an information terminal having a display screen for receiving the update status information regarding the status of the program update process in the control device 120 via the communication device 110 and displaying the received update status information. The mobile device 300 displays a predetermined notification or a permission request on its screen based on an instruction to display the update status information transmitted from the control device 120 via the wireless network, or based on an instruction to display the update status information transmitted from the vehicle management server 200 via the wireless network. Examples of the mobile device 300 include a general-purpose device owned by a user of the vehicle 100 such as a smartphone, a tablet device, or a personal computer.

In the program update system 10 in FIG. 1, the display device 130 and the mobile device 300 are included in the configuration of the information terminal for displaying the update status information regarding the status of the program update process in the control device 120. Alternatively, only one of the display device 130 and the mobile device 300 may be used. Further, a configuration other than the display device 130 and the mobile device 300 may be included as the information terminal as long as the update status information can be displayed and can be presented to the user of the vehicle 100. The control device 120 that is performing the update may perform the instruction to display the update status information to the display device 130 and the mobile device 300. Alternatively, the vehicle management server 200 may appropriately receive the update status from the control device 120 that is performing the update to perform the instruction to display the update status information to the display device 130 and the mobile device 300.

First Example

Figure 4B:
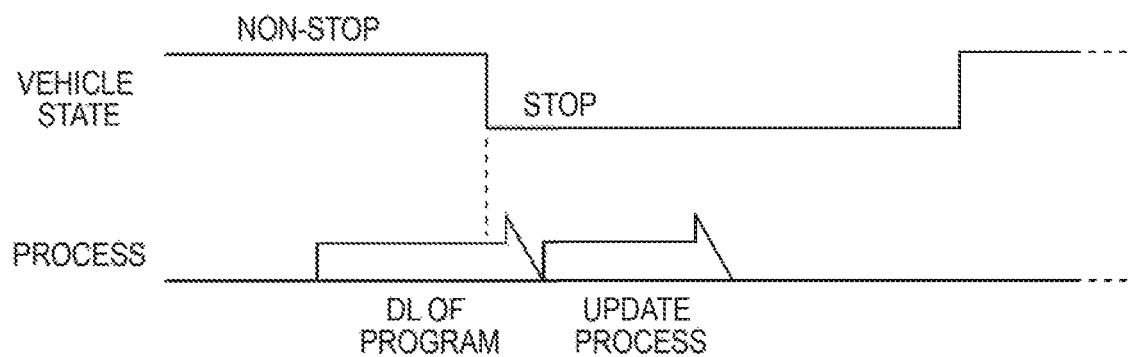
FIG. 4B is an example of the transition in the vehicle state and the start timing of the update process in the first example.

FIG. 3 is a flowchart illustrating a procedure of a program update process according to a first example, which can be executed by the control device 120. FIGS. 4A and 4B are timing charts illustrating examples of the program update process according to the first example.

The process illustrated in FIG. 3 is started, for example, when a power supply of the vehicle 100 is turned on.

Step S301

The controller 122 of the control device 120 inquires the vehicle management server 200 via the communicator 121 whether the update is available for the current program stored in the first storage area 1231 of the memory 123.

Step S302

The controller 122 of the control device 120 receives a response from the vehicle management server 200 via the communicator 121 on the inquiry. When the controller 122 receives from the vehicle management server 200 a response indicating that the update is available (step S302: YES), the process proceeds to step S303. When the controller 122 receives a response indicating that the update is not available (step S302: NO), this process ends.

Step S303

The controller 122 of the control device 120 downloads the update program from the vehicle management server 200 via the communicator 121. The downloaded update program is stored in the second storage area 1232 of the memory 123. The download of the update program does not affect the vehicle control, and is performed in the background without limiting the vehicle control.

Step S304

The controller 122 of the control device 120 determines whether the vehicle 100 is in a stop state. Examples of the stop state include a state in which a power supply of the vehicle 100 is off (for example, an ignition switch is off), a state in which a shift position is in a parking (P) position, and a state in which a speed of the vehicle 100 is zero. These states can be easily determined based on various pieces of vehicle information that can be obtained from various devices mounted on the vehicle 100. When the vehicle 100 is in the stop state (step S304: YES), the process proceeds to step S305.

Step S305

The controller 122 of the control device 120 starts a process of updating the current program stored in the first storage area 1231 of the memory 123 with the update program stored in the second storage area 1232 of the memory 123.

Step S306

The controller 122 of the control device 120 determines whether the program update process has been completed. When the update process has been completed (step S306: YES), this process ends.

FIG. 4A illustrates a case in which the download of the update program is completed during a period in which the vehicle 100 is in a non-stop state, and thereafter, the vehicle 100 transitions to the stop state. In this case, the program update process is not started until the vehicle 100 transitions to the stop state. By starting the update process at this timing, it can be expected that there is enough time until the execution of the current program is requested. Thus, it is possible to suppress the occurrence of the interruption in the program update process.

FIG. 4B illustrates a case in which the download of the update program is started during a period in which the vehicle 100 is in the non-stop state, and the vehicle 100 transitions to the stop state before the download is completed. In this case, the program update process is started subsequent to the completion of the download of the update program. Also when the update process is started at this timing, it can be expected that there is enough time until the execution of the current program is requested, and thus it is possible to suppress the occurrence of the interruption in the program update process.

To restrain the update process from being interrupted after the program update process is started, the vehicle control related to the program that is being updated is desirably subjected to a predetermined measure until the update is completed. The predetermined measure is, for example, when the program is an engine control program, a process that limits an increase in an engine speed. With such a measure, even when the vehicle 100 transitions to the non-stop state during the program update process, the update can be completed without interruption in the update process. Therefore, it is possible to suppress an increase in the time of the update process.

Second Example

Figure 5A:
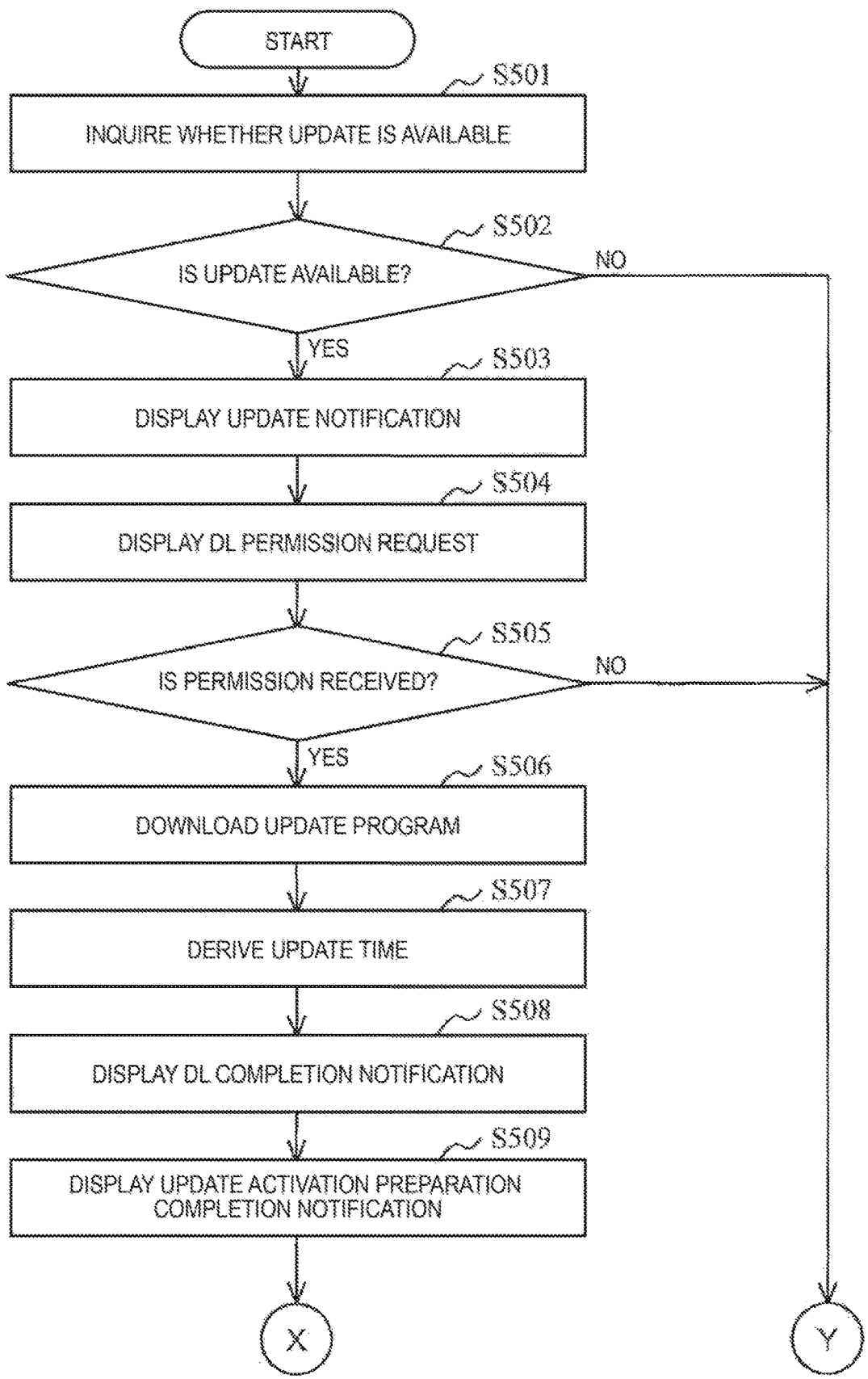
FIG. 5A is a flowchart of a program update process executed by a control device according to a second example.
Figure 5B:
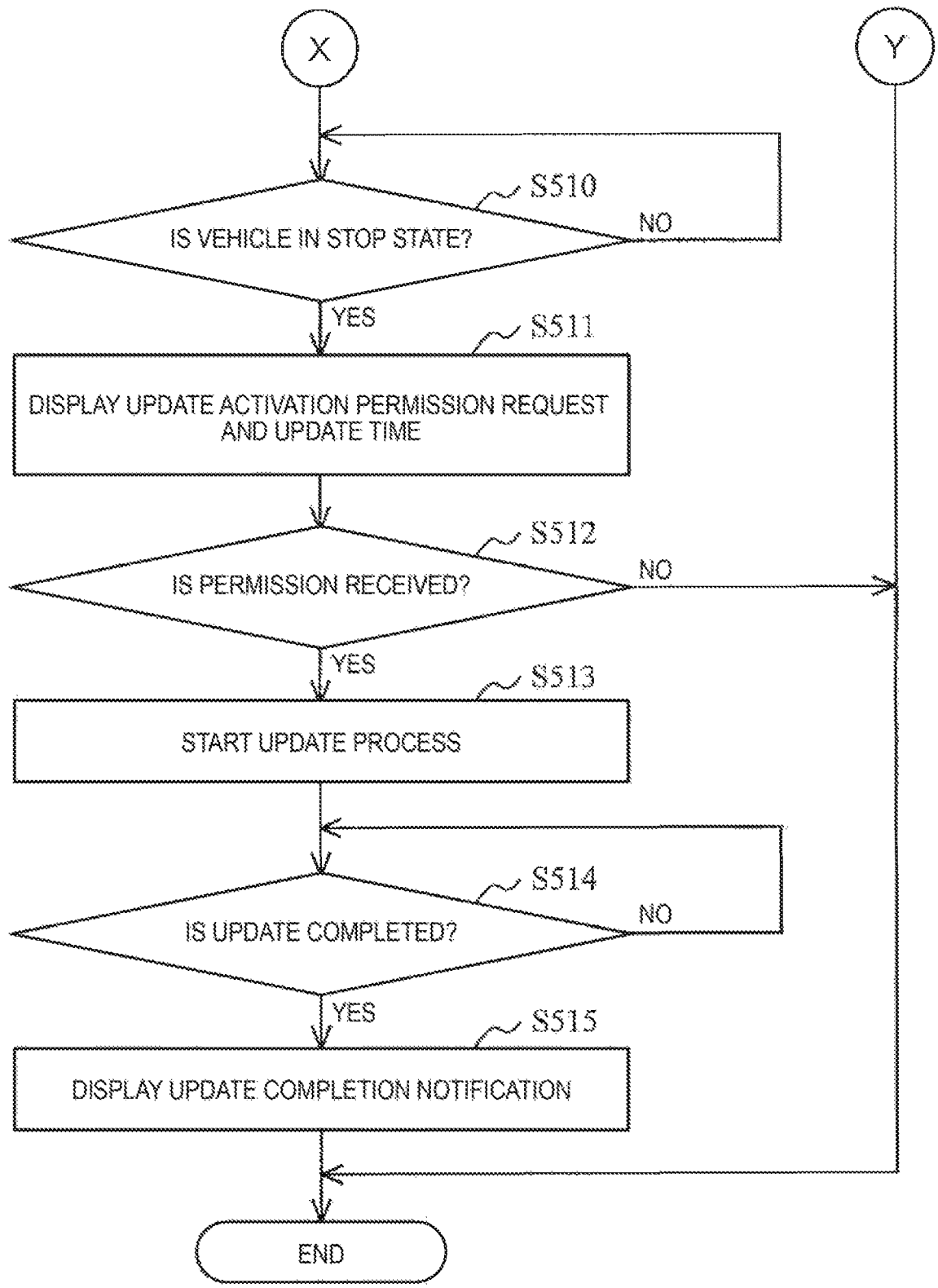
FIG. 5B is a flowchart of the program update process executed by the control device according to the second example.
Figure 6A:
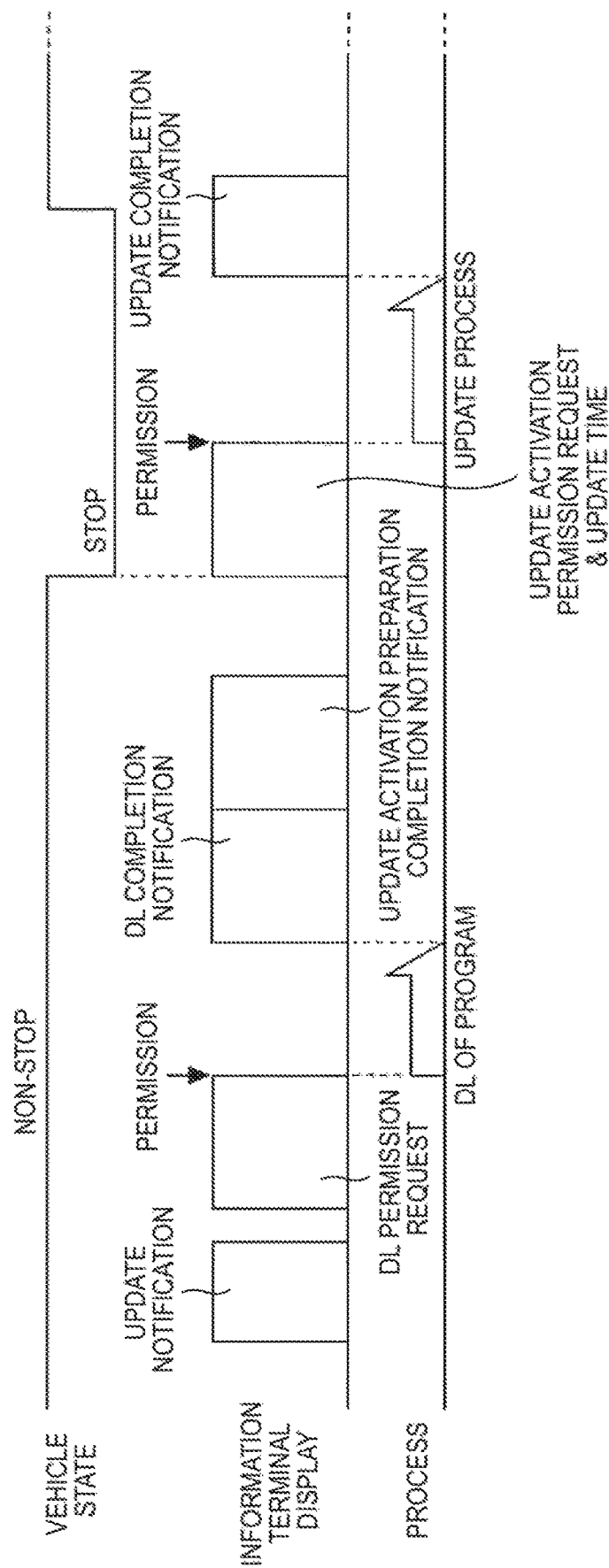
FIG. 6A is an example of a transition in a vehicle state and a start timing of the update process in the second example.

FIGS. 5A and 5B are flowcharts illustrating a procedure of a program update process according to a second example, which can be executed by the control device 120. Processes in FIG. 5A and processes in FIG. 5B are connected by connectors X and Y. FIGS. 6A and 6B are timing charts illustrating examples of the program update process according to the second example.

In the second example, a process of displaying the update status information on a screen of the display device 130 or the mobile device 300 is added to the process of the first example.

Examples of the update status information include an update notification indicating that the update program is available, a download (DL) permission request for asking the user of the vehicle 100 for permission to download the update program from the vehicle management server 200 to the control device 120, a DL completion notification indicating that the download of the update program from the vehicle management server 200 to the control device 120 has been completed, an update activation preparation completion notification indicating that the preparation for activating the update process of the current program with the update program has been completed, an update activation permission request for asking the user of the vehicle 100 for permission to activate the update process of the current program using the update program (that is, permission to switch controls), and an update completion notification indicating that the update process of the current program using the update program has been completed. Examples of the update status information also include the time required for an over-the-air (OTA) update process, which is a notification requirement in the regulations of the World Forum for Harmonization of Vehicle Regulations (WP29).

The process shown in FIG. 5A is started, for example, when the power supply of the vehicle is turned on.

Step S501

The controller 122 of the control device 120 inquires the vehicle management server 200 via the communicator 121 whether the update is available for the current program stored in the first storage area 1231 of the memory 123.

Step S502

The controller 122 of the control device 120 receives a response from the vehicle management server 200 via the communicator 121 on the inquiry. When the controller 122 receives from the vehicle management server 200 a response indicating that the update is available (step S502: YES), the process proceeds to step S503. When the controller 122 receives a response indicating that the update is not available (step S502: NO), this process ends.

Step S503

The controller 122 of the control device 120 causes the display device 130 or the mobile device 300 to display the update notification via the communicator 121, the communication device 110, and the vehicle management server 200.

Step S504

The controller 122 of the control device 120 causes the display device 130 or the mobile device 300 to display the DL permission request on its screen via the communicator 121, the communication device 110, and the vehicle management server 200.

Step S505

The controller 122 of the control device 120 determines whether the controller 122 has received a response, from the display device 130 or the mobile device 300, indicating a permission to download the update program. When the permission has been received (step S505. YES), the process proceeds to step S506, and when no permission has been received (step S505: NO), this process ends.

Step S506

The controller 122 of the control device 120 downloads the update program from the vehicle management server 200 via the communicator 121. The downloaded update program is stored in the second storage area 1232 of the memory 123. The download of the update program does not affect the vehicle control, and is performed in the background without limiting the vehicle control.

Step S507

The controller 122 of the control device 120 derives an update time that is a time that is estimated to be required from the start of the update process to the completion of the update process. The update time typically represents a time from the start of the update process to the completion of the update process without interruption therebetween, assuming that the vehicle control related to the program that is being updated is subjected to the predetermined measure. The update time is derived based on a size of the update program.

Step S508

The controller 122 of the control device 120 causes the display device 130 or the mobile device 300 to display the DL completion notification on its screen via the communicator 121, the communication device 110, and the vehicle management server 200.

Step S509

The controller 122 of the control device 120 causes the display device 130 or the mobile device 300 to display the update activation preparation completion notification on its screen via the communicator 121, the communication device 110, and the vehicle management server 200.

Step S510

The controller 122 of the control device 120 determines whether the vehicle 100 is in the stop state. Examples of the stop state include the state in which the ignition switch of the vehicle 100 is off (IG-OFF), the state in which the shift position is in the parking (P) position, and the state in which the speed of the vehicle 100 is zero. These states can be easily determined based on various pieces of the vehicle information that can be obtained from various devices mounted on the vehicle 100. When the vehicle 100 is in the stop state (step S510: YES), the process proceeds to step S511.

Step S511

The controller 122 of the control device 120 causes the display device 130 or the mobile device 300 to display the update activation permission request and the update time on its screen via the communicator 121, the communication device 110, and the vehicle management server 200.

Step S512

The controller 122 of the control device 120 determines whether the controller 122 has received a response, from the display device 130 or the mobile device 300, indicating a permission to activate the update program. When the permission has been received (step S512: YES), the process proceeds to step S513, and when no permission has been received (step S512: NO), this process ends.

Step S513

The controller 122 of the control device 120 starts the process of updating the current program stored in the first storage area 1231 of the memory 123 with the update program stored in the second storage area 1232 of the memory 123.

Step S514

The controller 122 of the control device 120 determines whether the program update process has been completed. When the update process has been completed (step S514: YES), the process proceeds to step S515.

Step S515

The controller 122 of the control device 120 causes the display device 130 or the mobile device 300 to display the update completion notification via the communicator 121, the communication device 110, and the vehicle management server 200. When the update completion notification has been displayed, this process ends.

FIG. 6A illustrates a case in which the download of the update program is completed during a period in which the vehicle 100 is in the non-stop state, and thereafter, the vehicle 100 does not transition to the stop state even after the DL completion notification and the update activation preparation completion notification is displayed. In this case, the update activation permission request and the update time are not displayed until the vehicle 100 transitions to the stop state. After the update activation is permitted, the program update process is started. By starting the update process at this timing, it can be expected that there is enough time until the execution of the current program is requested, and thus it is possible to suppress the occurrence of the interruption in the program update process.

FIG. 6B illustrates a case in which the download of the update program is completed during a period in which the vehicle 100 is in the non-stop state, and the vehicle 100 transitions to the stop state during the update activation preparation completion notification subsequent to the completion of the download of the update program. In this case, the update activation permission request and the update time are displayed subsequent to the update activation preparation completion notification. After the update activation is permitted, the program update process is started. Also when the update process is started at this timing, it can be expected that there is enough time until the execution of the current program is requested, and thus it is possible to suppress the occurrence of the interruption in the program update process. The example in FIG. 6B illustrates a case in which the vehicle 100 transitions to the non-stop state before the program update process is completed. In this case, the vehicle control related to the program that is being updated is subjected to the predetermined measure from the time the vehicle 100 transitions to the non-stop state to the time the update process is completed (the time the update completion notification is displayed).

The second example describes the case in which the update notification, the DL permission request, the DL completion notification, the update activation preparation completion notification, the update time, the update activation permission request, and the update completion notification are all displayed. Alternatively, with at least the update time displayed, other notifications and requests may be partially or entirely omitted.

Operations and Effects

As described above, in the vehicle control device, the program update method, and the program update system according to the embodiment of the present disclosure, the memory has the first storage area for storing the program related to the vehicle control and the second storage area for storing the update program for updating the program, and the update program is downloaded from the vehicle management server to the second storage area without affecting the vehicle control. When it is determined that the vehicle is in the stop state (the power supply of the vehicle is off, the parking brake is activated, the vehicle speed is zero, etc.), the update process for updating the program stored in the first storage area with the update program stored in the second storage area is started.

As described above, the program update process is started at the timing at which the vehicle is in the stop state and at which it is assumed that there is enough time until the execution of the current program is requested. Thus, it is possible to suppress the occurrence of the interruption in the program update process.

Further, in the vehicle control device, the program update method, and the program update system according to the embodiment of the present disclosure, after the update program is downloaded from the vehicle management server to the second storage area, the update time that is the time estimated to be required from the start of the update process to the completion of the update process is derived based on the update program and displayed on the information terminal. Thus, it is possible to present a highly accurate update time to the user of the vehicle.

With the highly accurate update time presented in this way, for example, when the update time has been presented to the user of the vehicle at a parking lot located away from the user's home, the user of the vehicle can return to the vehicle after the update time has elapsed. In this case, the update process has been completed, so the user can operate the vehicle immediately after returning to the vehicle. Thus, it is possible to reduce the trouble of having to wait in the vehicle without knowing the exact time required for the update to be completed.

Further, in the vehicle control device, the program update method, and the program update system according to the embodiment of the present disclosure, when the permission request for activating the update process is displayed on the information terminal, it is possible to present a highly accurate update time together with the permission request. Thus, the user of the vehicle can permit the update of the program knowing the time required for the update of the program.

Although the embodiment of the present disclosure has been described above, the applicable embodiment is not limited to the vehicle control device and the program update system, and can also be applied to a program update method, a control program for the program update method, a computer-readable non-transitory storage medium storing the control program, and a vehicle including the program update system.

The present disclosure can be used for a control device mounted on a vehicle or the like.

What is claimed is:

1. A control device configured to notify a user of update of a program related to vehicle control, the control device comprising at least one processor configured to:
   in a condition that a vehicle that is controlled in accordance with the program related to the vehicle control is in a stop state, display
      (i) information to request the user for an approval of the vehicle control in accordance with an update program, and
      (ii) update time that is required from reception of the approval to completion of the update, the update time being derived based on a size of the update program, wherein the information to request and the update time are displayed simultaneously;
   determine whether the at least one processor receives the approval from the user; and
   in response to receiving the approval from the user, execute a measure to limit execution of engine control of the vehicle and then perform a process to enable the vehicle to execute the vehicle control in accordance with the update program while the vehicle control is restricted by the measure,
   wherein the measure is executed continuously until the update is completed, regardless of whether the vehicle transitions from the stop state to the non-stop state before the completion of the update.

2. The control device according to claim 1, wherein the at least one processor is further configured to:
   download the update program from a management server that manages the update program;
   derive, when the update program is downloaded, an estimated time required for a process to enable the vehicle to control in accordance with the update program; and
   notify an information terminal that is communicable with the vehicle of at least the estimated time when the vehicle is in the stop state after deriving the estimated time.

3. The control device according to claim 2, wherein the at least one processor is further configured to:
   allow, when the vehicle is in the stop state after deriving the estimated time, the information terminal to notify the request for asking the user for the approval; and start an update process when the information terminal receives the approval.

4. The control device according to claim 1, wherein the stop state is at least a state in which a power supply of the vehicle is off.

5. The control device according to claim 1, wherein the stop state is at least a state in which a parking brake is activated.

6. The control device according to claim 1, wherein the stop state is at least a state in which a vehicle speed is zero.

7. The control device according to claim 1, wherein the at least one processor is further configured to:
when the vehicle is in the stop state, control the notification unit to notify an estimated time required for a process to enable the vehicle to control in accordance with the update program.

8. The control device according to claim 1, wherein
the notification unit is an information display and is configured to display the request for asking the user for the approval.

9. The control device according to claim 1, wherein
the vehicle control controls a speed of the vehicle, and the measure limits the speed of the vehicle.

10. The control device according to claim 1, wherein the at least one processor is further configured to:
display an update activation preparation completion notification prior to simultaneously displaying the information to request and the update time.

11. A program update method for notifying a user of update of a program related to vehicle control, the method being performed by at least one processor, the method comprising:
in a condition that a vehicle that is controlled in accordance with the program related to the vehicle control is in a stop state, displaying
(i) information to request the user for an approval of the vehicle control in accordance with an update program, and
(ii) update time that is required from reception of the approval to completion of the update, the update time being derived based on a size of the update program, wherein the information to request and the update time are displayed simultaneously;
determining whether the at least one processor receives the approval from the user; and
in response to receiving the approval from the user, executing a measure to limit execution of engine control of the vehicle and then performing a process to enable the vehicle to execute the vehicle control in accordance with the update program while the vehicle control is restricted by the measure,
wherein the measure is executed continuously until the update is completed, regardless of whether the vehicle transitions from the stop state to the non-stop state before the completion of the update.

12. A program update system configured to notify a user of update of a program related to vehicle control, the program update system comprising at least one processor configured to:
in a condition that a vehicle that is controlled in accordance with the program related to the vehicle control is in a stop state, display
(i) information to request the user for an approval of the vehicle control in accordance with an update program, and
(ii) update time that is required from reception of the approval to completion of the update, the update time being derived based on a size of the update program, wherein the information to request and the update time are displayed simultaneously;
determine whether the at least one processor receives the approval from the user; and
in response to receiving the approval from the user, execute a measure to limit execution of engine control of the vehicle and then perform a process to enable the vehicle to execute the vehicle control in accordance with the update program while the vehicle control is restricted by the measure,
wherein the measure is executed continuously until the update is completed, regardless of whether the vehicle transitions from the stop state to the non-stop state before the completion of the update.

* * * * *